United States Patent
Hongou et al.

(10) Patent No.: US 12,454,115 B2
(45) Date of Patent: Oct. 28, 2025

(54) EASY-OPEN PACKAGING BAG, AND EASY-OPEN LAMINATE FILM AND POUCH HAVING GAS BARRIER PROPERTIES

(71) Applicant: TOYO SEIKAN CO., LTD., Tokyo (JP)

(72) Inventors: Masahiro Hongou, Yokohama (JP); Shie Matsunaga, Yokohama (JP)

(73) Assignee: TOYO SEIKAN CO., LTD., Tokyo (JP)

( * ) Notice: Subject to any disclaimer, the term of this patent is extended or adjusted under 35 U.S.C. 154(b) by 250 days.

(21) Appl. No.: 17/278,059

(22) PCT Filed: Sep. 12, 2019

(86) PCT No.: PCT/JP2019/035865
§ 371 (c)(1),
(2) Date: Mar. 19, 2021

(87) PCT Pub. No.: WO2020/059629
PCT Pub. Date: Mar. 26, 2020

(65) Prior Publication Data
US 2021/0347144 A1  Nov. 11, 2021

(30) Foreign Application Priority Data

Sep. 21, 2018 (JP) ................................. 2018-177412
Nov. 8, 2018 (JP) ................................. 2018-210588

(51) Int. Cl.
*B32B 3/24* (2006.01)
*B32B 3/26* (2006.01)
(Continued)

(52) U.S. Cl.
CPC ................ *B32B 3/26* (2013.01); *B32B 27/08* (2013.01); *B65D 65/40* (2013.01);
(Continued)

(58) Field of Classification Search
CPC ............ B32B 3/26; B32B 27/08; B32B 3/266
See application file for complete search history.

(56) References Cited

U.S. PATENT DOCUMENTS 5,229,180 A * 7/1993 Littmann .............. B29C 59/007
428/209
7,285,334 B1 * 10/2007 Yamashita ........... H01M 50/116
428/458
(Continued)

FOREIGN PATENT DOCUMENTS

JP   H02-219749 A    9/1990
JP   2728376 B2 *   3/1998
(Continued)

OTHER PUBLICATIONS

International Search Report mailed Dec. 3, 2019 in PCT/JP2019/035865 with English-language translation (5 pgs.).
(Continued)

*Primary Examiner* — William P Watkins, III
(74) *Attorney, Agent, or Firm* — Foley & Lardner LLP

(57) ABSTRACT

Provided is a packaging bag in which the difficulty of tearing caused by temperature rising is resolved. The easy to open packaging bag for sealing a laminated film by heat sealing, wherein the laminated film includes an inner layer film, an intermediate layer film having an opening induction flaw formed thereon, and an outer layer film including a biaxially oriented film, and wherein a molecular orientation angle of the outer layer film is less than 49°. Also provided are a laminated film and a pouch having easy to open properties while maintaining excellent barrier properties. The laminated film is obtained by laminating (a) an outer layer film, (b) a barrier layer having an opening induction flaw, and (c) an inner layer film, and has a barrier ink covering the opening induction flaw in the barrier layer.

4 Claims, 3 Drawing Sheets

(51) Int. Cl.
    *B32B 27/08*     (2006.01)
    *B65D 65/40*     (2006.01)
    *B65D 75/58*     (2006.01)

(52) U.S. Cl.
    CPC ...... *B65D 75/5888* (2013.01); *B32B 2307/31* (2013.01); *B65D 2565/00* (2013.01)

(56) References Cited

U.S. PATENT DOCUMENTS

| | | | |
|---|---|---|---|
| 2005/0084636 A1 | 4/2005 | Papenfuss et al. | |
| 2006/0078693 A1 | 4/2006 | Ishibashi et al. | |
| 2016/0085102 A1* | 3/2016 | Ohmuro | G02B 5/305 |
| | | | 362/19 |
| 2022/0024660 A1* | 1/2022 | Hongo | B32B 27/34 |

FOREIGN PATENT DOCUMENTS

| | | | |
|---|---|---|---|
| JP | 2001-247133 A | | 9/2001 |
| JP | 2002-264237 A | | 9/2002 |
| JP | 2003-072006 A | | 3/2003 |
| JP | 2003-311859 A | | 11/2003 |
| JP | 2006096801 A | * | 4/2006 |
| JP | 2006-133720 A | | 5/2006 |
| JP | 2006-175729 A | | 7/2006 |
| JP | 2007-106497 A | | 4/2007 |
| JP | 2008-273610 A | | 11/2008 |
| JP | 2009-034845 A | | 2/2009 |
| JP | 2013-256047 A | | 12/2013 |
| JP | 2014218278 A | * | 11/2014 |
| JP | 2016044308 A | * | 4/2016 |
| JP | 2016-104637 A | | 6/2016 |
| JP | 2016-150772 A | | 8/2016 |
| JP | 2018-002217 A | | 1/2018 |
| JP | 2018-020844 A | | 2/2018 |
| JP | 2018-087028 A | | 6/2018 |

OTHER PUBLICATIONS

Notice of Reasons for Refusal issued in connection with JP Appl. Ser. No. 2018-210588 dated Aug. 9, 2022.
Japanese Office Action issued in connection with JP Appl. Ser. No. 2018-177412 dated Dec. 6, 2022 (6 pages).

* cited by examiner

Orientation angle of the biaxially oriented PET = 44°

Orientation angle of the biaxially oriented PET = 53°

EASY-OPEN PACKAGING BAG, AND EASY-OPEN LAMINATE FILM AND POUCH HAVING GAS BARRIER PROPERTIES

CROSS REFERENCE TO RELATED APPLICATIONS

This application is a national stage entry of International Appl. No. PCT/JP2019/035865, filed Sep. 12, 2019; which claims priority to Japanese Appl. Nos. 2018-177412, filed Sep. 21, 2018 and 2018-210588, filed Nov. 8, 2018; the contents of which are incorporated by reference herein in their entirety.

TECHNICAL FIELD

The first invention of the present application relates to a packaging bag which is sealed by heat sealing a laminated film and which is excellent in tear-open properties.

Further, the second invention of the present application relates to an easy to open laminated film and a pouch having gas barrier properties.

BACKGROUND ART

In a packaging bag using a laminated film provided with a biaxially oriented film, it has been proposed to use the biaxially oriented film having a small molecular orientation angle of 15° or less in order to impart easy to open properties (Patent Document 1).

In addition, in Patent Document 2, a contrivance has been made in which a tearing force is reduced by blending a specific polymer, and then the molecular orientation angle is set to 22.5° or less.

Further, the laminated film has a structure in which at least three films of an outer layer film, a barrier layer, and an inner layer film are laminated, and a bag-shaped pouch is formed from the laminated film. By filling the inside of this pouch with food, medicine and other things to be sealed, and further sealing the filling port, for example, it can be stored for a long period of time.

Here, when storage for a long period of time is required, specifically, barrier properties against gases such as oxygen or water vapor in the air are often required. Therefore, the laminated film requires the gas barrier layer in addition to the outer layer film and the inner layer film.

On the other hand, an opening induction flaw is inserted so that the pouch can be opened easily when opening such a pouch (Patent Document 3). This is because a resin such as unstretched polypropylene is usually used as the inner layer film of the pouch, so that it cannot be easily opened by hand.

Therefore, in the prior art, as shown in FIG. 4, a material having excellent straight-cut properties was used for the outer layer film, and in order to make it easier to open the inner layer film, the opening induction flaw reaching a part of the inner layer film from the barrier layer, which was an intermediate layer, was necessary.

PRIOR ART DOCUMENT

Patent Document

Patent Document 1: JP H02-219749 A
Patent Document 2: JP 2001-247133 A
Patent Document 3: JP 2016-150772 A

SUMMARY OF THE INVENTION

Technical Problems

However, in both cases of Patent Document 1 and Patent Document 2, the molecular orientation angle of the biaxially oriented film is still required to be small, and further improvement has been necessary in order to realize easy to open properties of the packaging bag using the laminated film.

On the other hand, for example, in the packaging bag filled with food, the bag filled with retort food is often used by warming the contents in hot water or the like before opening.

Although in this case as well, easy to open properties of the packaging bag are important, we have now found for the first time that easy to open properties differ greatly depending on the temperature of the packaging bag. That is, it was found that as the temperature for warming in hot water rises from 30° C. to 98° C., easy to open properties decrease, and delamination of the laminated film tends to occur at the time of opening.

Further, when the opening induction flaw is provided as described above, it is necessary to remove a part of the barrier layer, and there is a problem that the barrier performance is naturally deteriorated in that part.

Therefore, an object of the first invention of the present application is to provide an easy to open packaging bag using a biaxially oriented film having a large range of molecular orientation angles which has not been known conventionally.

Another object of the first invention of the present application is to provide an easy to open packaging bag which is resistant to temperature changes.

An object of the second invention of the present application is to provide a laminated film and a pouch which do not deteriorate the barrier performance even when an opening induction flaw is provided.

Means for Solving the Problems

In order to solve the above problems, in one embodiment of the first invention of the present application, it has been found that a packaging bag having easy to open properties can be obtained when the molecular orientation angle in the flow direction of the biaxially oriented film constituting the outer layer is less than 49°. At the same time, it has been found that it is possible to obtain a packaging bag in which the difficulty of tearing caused by temperature rising, which has not been known conventionally, is resolved.

That is, the first invention of the present application is an easy to open packaging bag for sealing a laminated film by heat sealing, wherein the laminated film includes an inner layer film, an intermediate layer film having an opening induction flaw formed thereon, and an outer layer film including a biaxially oriented film, and wherein a molecular orientation angle of the outer layer film is less than 49°.

According to the second invention of the present application, a good barrier performance can be obtained by providing a barrier ink covering an opening induction flaw in a barrier layer between an outer layer film and the barrier layer.

That is, the present invention is shown below.
1. A laminated film, wherein (a) an outer layer film, (b) a barrier layer having an opening induction flaw, and (c) an inner layer film are laminated, and the laminated film has a barrier ink covering the opening induction flaw in the barrier layer.
2. The laminated film according to 1, wherein the outer layer film is a film having straight-cut properties.
3. A pouch including the laminated film according to 1 or 2.

Effect of the Invention

According to the first invention of the present application, by setting the molecular orientation angle of the outer layer film to less than 49° and providing the opening induction flaw in the intermediate layer film, it is possible to obtain a packaging bag having excellent tear-opening properties even when a biaxially oriented film having the molecular orientation angle in a range very larger than a conventional molecular orientation angle is used.

Further, according to the first invention of the present application, it is possible to suppress the occurrence of delamination of the outer layer film due to the elongation of the inner layer film caused by tear-opening at a high temperature by warming in hot water or microwave heating, and obtain a packaging bag having excellent tear-opening properties by following the opening induction flaw with tear-opening.

According to the second invention of the present application, it is possible to obtain a laminated film and a pouch having easy to open properties while maintaining excellent barrier properties.

DESCRIPTION OF EMBODIMENT

<Inner Layer Film>

Figure 1:
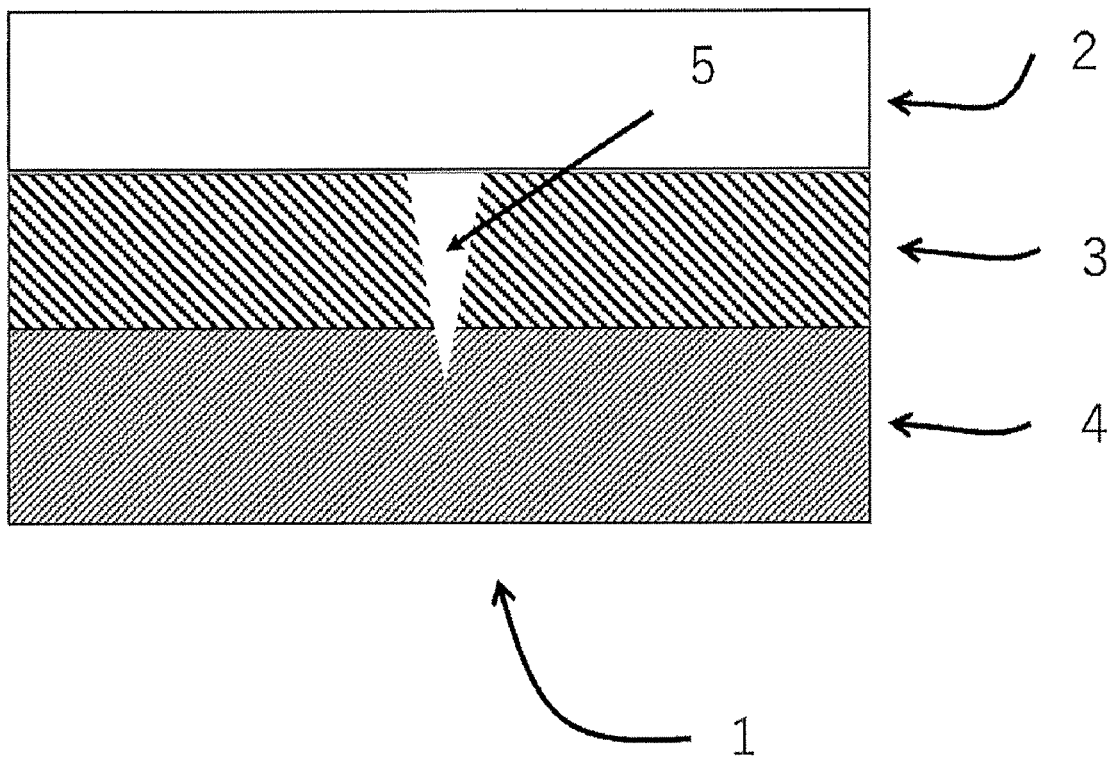
FIG. 1 is a diagram showing a laminated film with an opening induction flaw used in the present invention.
Figure 2:
FIG. 2 is a diagram showing easy to open properties according to one embodiment of the present invention.
Figure 3:
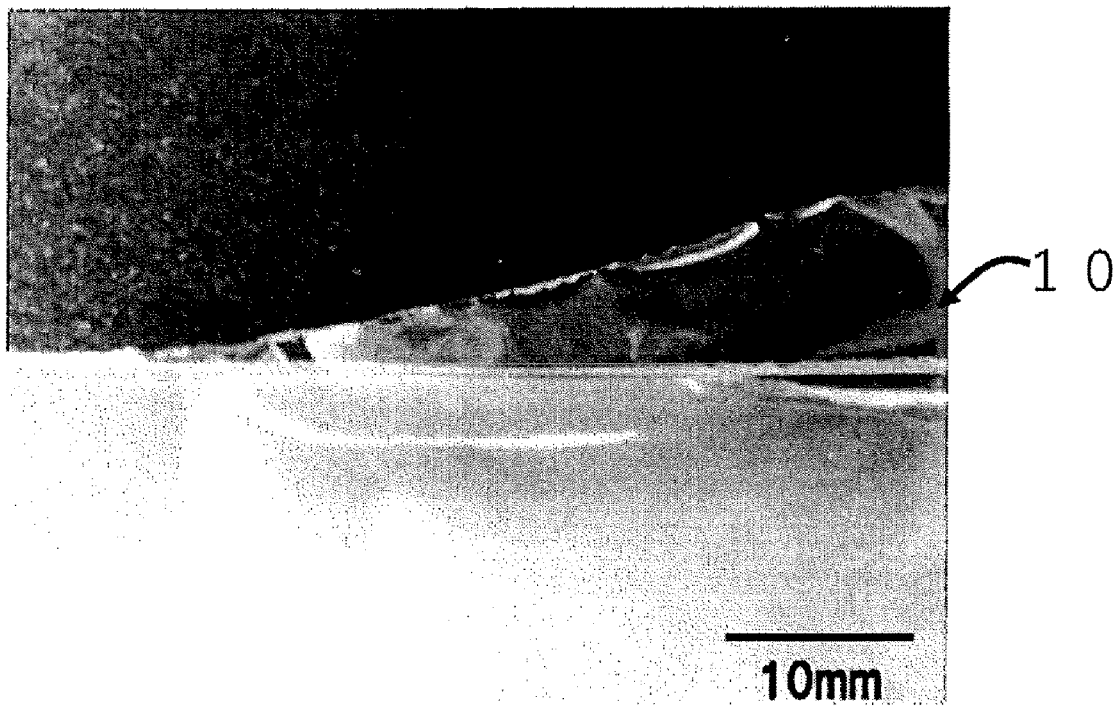
FIG. 3 is a diagram showing an opening example which caused delamination in Comparative Example.
Figure 4:
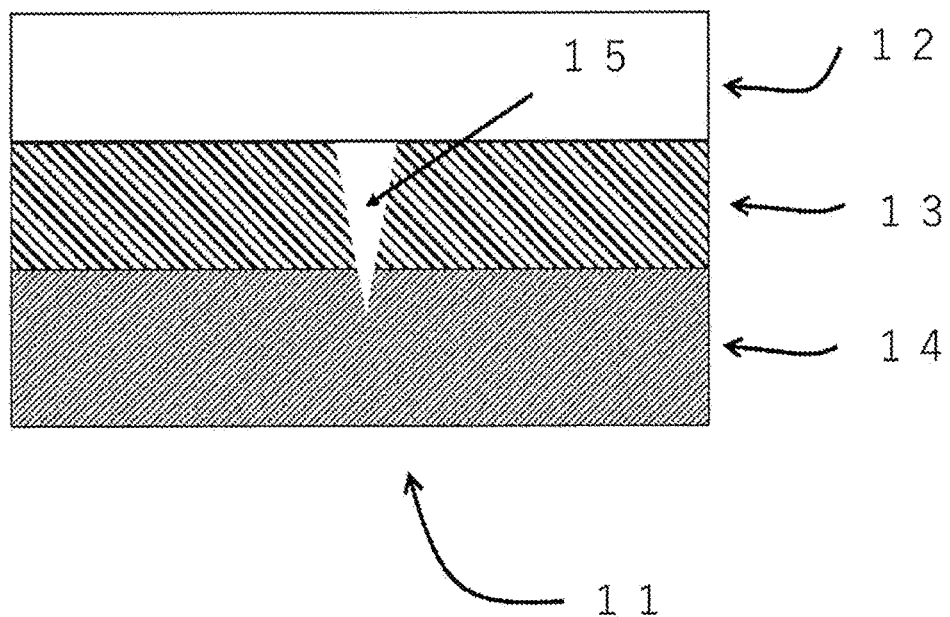
FIG. 4 shows a cross-sectional view of an easy to open laminated film which has a barrier layer as an intermediate layer which is conventionally used.

As the inner layer film serving as an innermost layer of the packaging bag of the first invention of the present application, various known materials can be used, and for example, a polyolefin having heat sealing properties can be used.

Examples of such polyolefins include low-density, medium-density, or high-density polyethylene, linear low-density polyethylene, isotactic polypropylene, syndiotactic polypropylene, ethylene-propylene copolymer, polybutene-1, poly4-methyl-1-pentene, ethylene-buten-1 copolymer, propylene-buten-1 copolymer, ethylene-propylene-buten-1 copolymer, ethylene-vinyl acetate copolymer, ionically crosslinked olefin copolymer (ionomer), ethylene-acrylic ester copolymer, and the like. These can be used alone or in the form of blend of two or more.

In particular, a propylene-based polymer is suitable from the viewpoint of heat resistance, and homopolypropylene or a random copolymer or a block copolymer mainly containing propylene can be used.

<Outer Layer Film>

As the outer layer film used in the first invention of the present application, various known materials can be used, and an orientation angle can be obtained by biaxial stretching, and examples thereof include polyamide, polyester, and the like.

Examples of the polyamide include, for example, Nylon 6, Nylon 66, Nylon 46, Nylon 69, Nylon 610, Nylon 612, Nylon 11, Nylon 12, Nylon MXD6, and the like. For ease of handling, Nylon 6 or Nylon 66 is preferred.

As the polyester, a condensation polymer obtained by polymerization of a monomer containing an aromatic dicarboxylic acid or an aliphatic dicarboxylic acid and a diol as a constituent such as polyethylene terephthalate (PET) or polybutylene terephthalate (PBT) is preferred. Among these, PBT and PET are preferable, and PET is more preferable.

Further, it is preferable that a barrier layer is formed on the outer layer film. The barrier layer may be formed on either the outer surface side of the outer layer film or the intermediate layer film side, but is desirably formed on the intermediate layer film side in terms of protecting the barrier layer from damage from the outside of the packaging bag.

The barrier layer is formed by depositing an inorganic material such as silicon oxide, a ceramic such as alumina, carbon, or the like by chemical vapor deposition (CVD), vacuum deposition, sputtering, ion plating, or the like.

Further, a coating layer containing a barrier resin coating agent including a polycarboxylic acid-based polymer, vinylidene chloride, or an ethylene-vinyl alcohol copolymer, or the like may be formed.

<Intermediate Layer Film>

In the first invention of the present application, at least one intermediate layer may be provided between the inner layer film and the outer layer film.

As the intermediate layer film, various known materials can be used, and it is preferable to use polybutylene terephthalate (PBT) or polyethylene terephthalate (PET) having low hygroscopicity, or a blend thereof.

In particular, it is preferable to use polybutylene terephthalate (PBT) having low hygroscopicity and impact resistance in order to prevent the packaging bag from falling and breaking.

In addition, it is preferable that the intermediate layer film has an opening induction flaw formed in a portion corresponding to a tear-opening portion of the packaging bag.

The opening induction flaw is formed as concave grooves or perforations by laser processing or a rotary cutter.

<Laminated Film>

The laminated film used in the first invention of the present application can be obtained by laminating the inner layer film, the intermediate layer film, and the outer layer film by a normal dry lamination method using a polyurethane-based adhesive.

<Packaging Bag>

The packaging bag according to the first invention of the present application can be formed by using the laminated film and heat sealing by laminating the inner layer film so as to face each other. The form of the pouch is not particularly limited, and examples thereof include a four-sided sealed pouch or a standing pouch.

<Molecular Orientation Angle>

Usually, in the biaxially oriented film, when a flow direction of the film is set to an angle of 0°, an orientation direction of a molecule, that is, a portion having a different molecular orientation angle is formed, and generally, the molecular orientation angle of a central portion of the film tends to be small and the molecular orientation angle of an extended portion tends to be large.

Then, in the first invention of the present application, one having the molecular orientation angle of less than 49° is selected and used as the outer layer film of the packaging bag.

A detailed method for measuring the molecular orientation angle of the outer layer film is described in Examples, but it is necessary to determine the molecular orientation angle in the flow direction of the outer layer film, which is less than 49°. As described in detail in Comparative Examples, if the molecular orientation angle is 49° or more, delamination of the laminated film may occur at the time of tear-opening.

Note that the lower limit of the molecular orientation angle of the outer layer film is not particularly limited, and examples thereof include those of more than 15°, those of more than 22.5°, and even those of more than 30°.

The second invention of the present application will be described with reference to FIG. 5.

<Outer Layer Film (Straight-Cut Film)>

Figure 5:
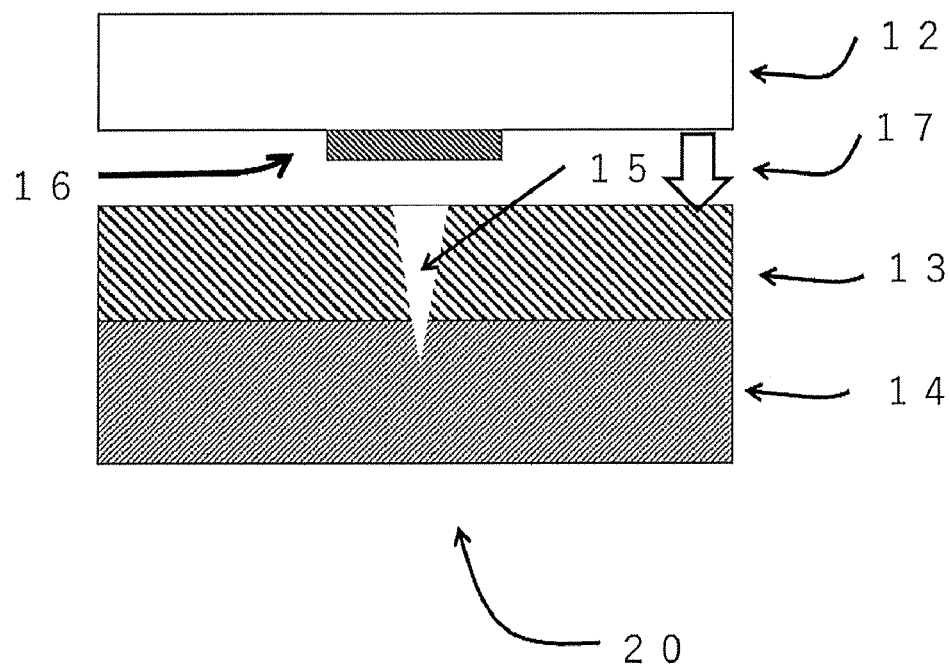
FIG. 5 is a cross-sectional view showing typically a laminated film according to the present invention.

In FIG. 5, in the easy to open laminated film 10 according to the present invention, a material having straight-cut properties is used as the outer layer film (straight-cut film) 12.

In the second invention of the present application, a conventional polyester-based straight-cut film can be used as the straight-cut film.

Examples of the film having straight-cut properties include a film formed by biaxially stretching a film including a blend of polybutylene terephthalate containing a polytetramethylene glycol unit and polyethylene terephthalate, or a film including a blend containing polyethylene terephthalate and a polyester elastomer, in which the polyester elastomer is dispersed in polyethylene terephthalate, and the like.

<Barrier Layer>

In the second invention of the present application, the barrier layer 13 is located between the outer layer film (straight-cut film) 12 and the inner layer film 14. The barrier layer 13 may be in direct contact with the inner layer film 14 or may be laminated with another layer interposed therebetween. Here, the barrier layer 13 is provided with the opening induction flaw 5, and the opening induction flaw 15 reaches a part of the inner layer film 14.

Here, the material of the barrier layer is not particularly limited as long as it is used for preventing deterioration of the contents when it is made into a pouch, for example.

Examples thereof include resins such as ethylene-vinyl alcohol copolymer (EVOH), polyvinylidene chloride resin (PVDC resin), polymetaxylene adipamide (MXD6), or polyvinyl alcohol (PVA), and combinations thereof.

In addition, examples of the barrier layer include a polyethylene terephthalate film or a polybutadiene film on which an inorganic material such as silicon oxide, a ceramic such as alumina, carbon, or the like is deposited by chemical vapor deposition (CVD), vacuum evaporation, sputtering, ion plating, or the like.

<Barrier Ink>

The barrier ink 16 is printed or coated on the side of the outer layer film (straight-cut film) 12 in contact with the barrier layer 13. The barrier ink 16 may be printed or coated over the entire outer layer film 12, or may be printed or coated in a size covering the opening induction flaw 5, or 5 to 10% larger than the opening induction flaw 15.

Further, although the barrier ink 16 may be provided between the barrier layer 13 and the inner layer film 14 at a position covering the opening induction flaw 15, the barrier ink 16 is preferably provided on the side of the outer layer film 12 in contact with the barrier layer 13 from the viewpoint that the barrier ink 16 can be printed in the gravure printing step of printing a design such as a character, a pattern, and a logo on the outer layer film 12.

In FIG. 5, although the outer layer film 12 and the barrier layer 13 are shown with a space between them for convenience of explanation, the easy to open laminated film 20 according to the second invention of the present application can be obtained by crimping the outer layer film 12 and the barrier layer 13 in the direction indicated by the arrow 17.

The material of the barrier ink is not particularly limited as long as it reduces the deterioration in the performance of the target barrier layer, and examples thereof include a combination of resins such as ethylene-vinyl alcohol copolymer (EVOH), polyvinyl alcohol (PVA), a mica-like inorganic material, and a metal alkoxide such as tetraethoxysilane.

<Production of Laminated Film>

After laminating the barrier layer 13 on the inner layer film 14, the barrier layer 13 can be irradiated with, for example, a laser or the like to form the opening induction flaw 15. Further, the opening induction flaw 15 may be formed with a rotary cutter from the barrier layer 13 side on the laminated film in which the barrier layer 13 is laminated on the inner layer film 14.

Then, the barrier ink part of the outer layer film (straight-cut film) 12 on which the barrier ink is printed or coated is laminated so as to cover the opening induction flaw 15 in the barrier layer 13, so that the easy to open laminated film according to the present invention can be produced.

<Production of Pouch>

The easy to open laminated film according to the second invention of the present application can be used to produce a standing pouch or a flat pouch of a known shape, and by heat sealing the filling port after filling the contents, the easy to open pouch including a laminated film having excellent barrier performance can be obtained.

EXAMPLES

Hereinafter, the first invention of the present application will be described by showing Examples, but the first invention of the present application is not limited to these Examples.

Examples 1 to 8, Comparative Examples 1 to 8

<Measurement of Molecular Orientation Angle of Outer Layer Film>

An outer layer film (biaxially oriented polyethylene terephthalate film) was cut out from the central portion at 5.0 cm in the width direction×4.0 cm in the flow direction using a phase difference measuring device (KOBRA-21ADH) manufactured by Oji Scientific Instruments Co., Ltd. The film was installed in the device so that the film flow direction had an angle of 0° defined in this measuring device, and the absolute value was used as the measurement result.

<Preparation of Laminated Film>

In the first lamination step, a polybutylene terephthalate film having a thickness of 15 μm as an intermediate layer film and a polypropylene film having a thickness of 70 μm as an inner layer film were laminated by dry lamination using a polyurethane-based adhesive to prepare a laminated film.

In the step of forming an opening induction flaw, the opening induction flaw was formed by half-cutting from the polybutylene terephthalate film side of the laminated film produced in the first lamination step using a rotary cutter.

In the second laminating step, an aluminum oxide vapor-deposited biaxially oriented polyethylene terephthalate film was laminated by dry lamination on the polybutylene terephthalate film surface of the laminated film on which the opening induction flaw was formed, using a polyurethane adhesive to prepare a laminated film.

<Preparation of Pouch>

A flat pouch having a height of 170 mm and a width of 130 mm was prepared by heat-sealing the laminated film prepared in the second lamination step so that the flow direction of the laminated film was the opening direction.

<Heating of Pouch by Warming in Hot Water>

The pouch was placed in hot water set to a predetermined temperature in a constant temperature water bath (BF600) manufactured by Yamato Scientific Co., Ltd., and heated for 20 minutes. As the contents, 180 ml of water was put in, and the upper part of the pouch was sealed by heat sealing.

<Measurement of Delamination When Opening Pouch>

Each pouch warmed in hot water was subjected to an easy to open test, and the cut part that was torn and opened was visually observed. It was judged that those opened along the opening induction flaw are a circle mark, those with a part of the outer layer film removed from the opening induction flaw are a triangle mark, and those with the outer layer film completely removed from the opening induction flaw are an X mark.

The results are summarized in Tables 1 and 2.

TABLE 1

| Examples | 1 | 2 | 3 | 4 | 5 | 6 | 7 | 8 |
|---|---|---|---|---|---|---|---|---|
| Molecular orientation angle of outer layer film (°) | 40 | 40 | 40 | 40 | 46 | 46 | 46 | 46 |
| Temperature for warming in hot water (° C.) | 30 | 50 | 70 | 98 | 30 | 50 | 70 | 98 |
| Easy to open properties | ○ | ○ | ○ | ○ | ○ | ○ | ○ | ○ |

TABLE 2

| Comparative Examples | 1 | 2 | 3 | 4 | 5 | 6 | 7 | 8 |
|---|---|---|---|---|---|---|---|---|
| Molecular orientation angle of outer layer film (°) | 49 | 49 | 49 | 49 | 54 | 54 | 54 | 54 |
| Temperature for warming in hot water (° C.) | 30 | 50 | 70 | 98 | 30 | 50 | 70 | 98 |
| Easy to open properties | Δ | x | x | x | x | x | x | x |

From Tables 1 and 2, it was found that even if the molecular orientation angle of the outer layer film changed slightly from 46° to 49°, easy to open properties of the pouch greatly deteriorated.

Furthermore, from Comparative Examples 1 and 4 in Table 2, it was found for the first time from this study that easy to open properties were greatly affected by the temperature for warming in hot water.

Then, it was found that easy to open properties can be ensured when the molecular orientation angle of the outer layer film is less than 49°, and the temperature for warming in hot water is in the range of 30 to 98° C.

Hereinafter, the second invention of the present application will be described by showing Examples, but the second invention of the present application is not limited to the following Examples.

Example 9

In the first lamination step, an alumina vapor-deposited biaxially oriented polyethylene terephthalate film having a thickness of 12 μm as the barrier layer 13 and a polypropylene film having a thickness of 70 μm as the inner layer film 14 were laminated by dry lamination using a polyurethane-based adhesive to prepare a laminated film.

In the step of forming an opening induction flaw, the opening induction flaw 15 was formed by half-cutting from the alumina vapor-deposited biaxially oriented polyethylene terephthalate film side of the laminated film produced in the first lamination step using a rotary cutter.

In the barrier ink coating step, a barrier ink 16 obtained by mixing tetraethoxysilane and polyvinyl alcohol was partially coated on a biaxially oriented polyester film having a thickness of 12 μm and having straight-cut properties, which is the outer layer film 12, as shown in FIG. 5 by gravure printing, and then dried.

In the second lamination step, the laminated film having the opening induction flaw 15 formed thereon prepared in the first lamination step was laminated by dry lamination on the biaxially oriented polyester film having straight-cut properties prepared in the barrier ink coating step using a polyurethane-based adhesive to prepare a laminated film. At this time, the laminated film was prepared so that the barrier ink 16 covered the opening induction flaw 15 as shown in FIG. 5.

A known flat pouch was prepared from this laminated film.

Example 10

A laminated film similar to that of Example 9 was prepared except that the barrier ink 16 was changed to a mixture of a mica-like inorganic material and an ethylene-vinyl alcohol copolymer.

A known flat pouch was prepared from this laminated film.

Comparative Example 9

A laminated film similar to that of Example 9 was prepared except that the barrier ink 16 was not coated and the opening induction flaw 15 was not formed.

A known flat pouch was prepared from this laminated film.

Comparative Example 10

A laminated film similar to that of Example 1 was prepared except that the barrier ink 16 was not coated.

A known flat pouch was prepared using this laminated film.

<Measurement of Oxygen Permeability>

A measurement piece was cut out from the pouches prepared in each Example and Comparative Example, and the oxygen permeability (cc/m$^2$*day*atm) was measured by MOCON method at 23° C. and a relative humidity of 60%. The results are shown in Table 3.

TABLE 3

| | Barrier ink | Opening induction flaw | Oxygen permeability (cc/m² *day*atm) |
|---|---|---|---|
| Example 9 | with | with | 0.0 |
| Example 10 | with | with | 0.5 |
| Comparative Example 9 | without | without | 0.0 |
| Comparative Example 10 | without | with | 0.7 |

From Table 3, it can be seen that the easy to open barrier laminated film of the present invention has good oxygen barrier properties. Further, the pouches of Examples 9 and 10 had good opening properties.

INDUSTRIAL APPLICABILITY

According to the first invention of the present application, it is possible to obtain an easy to open packaging bag using a biaxially oriented film having a molecular orientation angle in a range larger than a conventional molecular orientation angle.

In addition, it is possible to obtain a packaging bag in which the difficulty of tearing caused by temperature rising, which has not been known conventionally, is resolved.

According to the second invention of the present application, it is possible to obtain a laminated film and a pouch having easy to open properties while maintaining excellent barrier properties.

EXPLANATIONS OF LETTERS OR NUMERALS

1 Laminated film
2 Outer layer film
3 Intermediate layer film
4 Inner layer film
5 Opening induction flaw
10 Delaminated outer film
11 Conventional easy to open laminated film
12 Outer layer film (straight-cut film)
13 Barrier layer
14 Inner layer film
15 Opening induction flaw
16 Barrier ink
17 Crimping direction
20 Easy to open laminated film of the present invention

The invention claimed is:

1. An easy to open packaging bag for sealing a laminated film by heat sealing, wherein the laminated film comprises an inner layer film, an intermediate layer film having an opening induction flaw formed on the intermediate layer film, and an outer layer film including a biaxially oriented film, wherein a molecular orientation angle of the outer layer film is less than or equal to 46° and more than or equal to 40°, and wherein the molecular orientation angle means the absolute value measured when the outer layer film is installed in a measurement device so that a film flow direction has an angle of 0° defined by the measurement device.

2. The easy to open packaging bag according to claim 1, wherein the outer layer film is polyamide, polyethylene terephthalate, or polybutylene terephthalate.

3. The easy to open packaging bag according to claim 1, wherein the intermediate layer film is polybutylene terephthalate.

4. The easy to open packaging bag according to claim 2, wherein the intermediate layer film is polybutylene terephthalate.

* * * * *